(12) United States Patent
Elwood et al.

(10) Patent No.: US 9,460,413 B2
(45) Date of Patent: Oct. 4, 2016

(54) SYSTEM AND METHOD FOR PRODUCT TRACKING AND PRODUCT TEMPERATURE PROFILING

(75) Inventors: Bryan M. Elwood, Candler, NC (US); Walter Jeff Tipton, Asheville, NC (US); Charles G. Butts, Weaverville, NC (US); Paul M. Steinhoff, Leawood, KS (US)

(73) Assignee: Thermo Fisher Scientific Inc., Waltham, MA (US)

( * ) Notice: Subject to any disclaimer, the term of this patent is extended or adjusted under 35 U.S.C. 154(b) by 2519 days.

(21) Appl. No.: 10/026,840

(22) Filed: Dec. 27, 2001

(65) Prior Publication Data
US 2003/0067388 A1   Apr. 10, 2003

Related U.S. Application Data

(60) Provisional application No. 60/327,769, filed on Oct. 10, 2001.

(51) Int. Cl.
| G06Q 10/00 | (2012.01) |
| G06Q 10/08 | (2012.01) |
| A61J 1/14 | (2006.01) |
| G01K 1/02 | (2006.01) |
| G06Q 20/20 | (2012.01) |
| G07C 9/00 | (2006.01) |
| A61J 1/10 | (2006.01) |

(52) U.S. Cl.
CPC .......... *G06Q 10/087* (2013.01); *A61J 1/1462* (2013.01); *A61J 1/1475* (2013.01); *G01K 1/022* (2013.01); *G06Q 20/208* (2013.01); *G07C 9/00031* (2013.01); *A61J 1/10* (2013.01); *A61J 1/1487* (2015.05)

(58) Field of Classification Search
USPC .......................................... 705/28
See application file for complete search history.

(56) References Cited

U.S. PATENT DOCUMENTS

| 4,114,559 | A | * | 9/1978 | Rogen ........................... 116/216 |
| 4,210,899 | A | * | 7/1980 | Swonger .............. A61B 5/1172 340/5.53 |
| 4,859,360 | A | * | 8/1989 | Suzuki et al. ............. 252/299.7 |
| 5,364,385 | A | * | 11/1994 | Harms et al. ................. 604/410 |

(Continued)

OTHER PUBLICATIONS iButton, Dallas Semiconductor, 12 pages downloaded from http://www.archive.org using a search for http://www.ibutton.com for indormation from Oct. 12, 1999 downloaded on Aug. 23, 2008 and saved as NPL__iButton2.pdf.*

(Continued)

*Primary Examiner* — Paul Danneman
(74) *Attorney, Agent, or Firm* — Wood, Herron & Evans, LLP

(57) ABSTRACT

A storage unit for tracking events associated with an item is disclosed that includes a storage unit, a tracking device, and a processing and/or storage device. The tracking device monitors the presence of an item associated with the storage unit and the temperature of the item at discrete intervals of time. The processing and/or storage device is electrically connected to the tracking device and stores information generated from the tracking device. An automated access system may also be provided that grants access to the storage unit only to authorized users. An external network may also be provided which allows a user to monitor the storage unit including, access to the storage unit, and a temperature of the storage unit.

17 Claims, 16 Drawing Sheets

(56) References Cited

U.S. PATENT DOCUMENTS

| | | | | |
|---|---|---|---|---|
| 5,366,896 A | * | 11/1994 | Margrey et al. | 436/48 |
| 6,217,213 B1 | * | 4/2001 | Curry et al. | 374/178 |
| 6,326,892 B1 | * | 12/2001 | De La Forterie | 340/588 |
| 6,421,586 B1 | * | 7/2002 | Nicotera | 701/1 |
| 6,564,120 B1 | * | 5/2003 | Richard | G06F 7/36 414/277 |
| 2001/0033233 A1 | * | 10/2001 | Jentsch et al. | 340/870.17 |

OTHER PUBLICATIONS

NPL_Log_RealTime_1992-3-4.pdf ("Button3"), Memory iButton, 20 pages, downloaded from http://web/archive.org/web/19980610044042/www.dalsemi.com/DocControl/PDFs/1992-3-4.pdf on Aug. 13, 2010.*

NPL_iButton2.pdf ("Button2") downloaded on Aug. 23, 2008 from http://web.archive.org/web*/http://www.ibutton.com, 12 pages.*

* cited by examiner

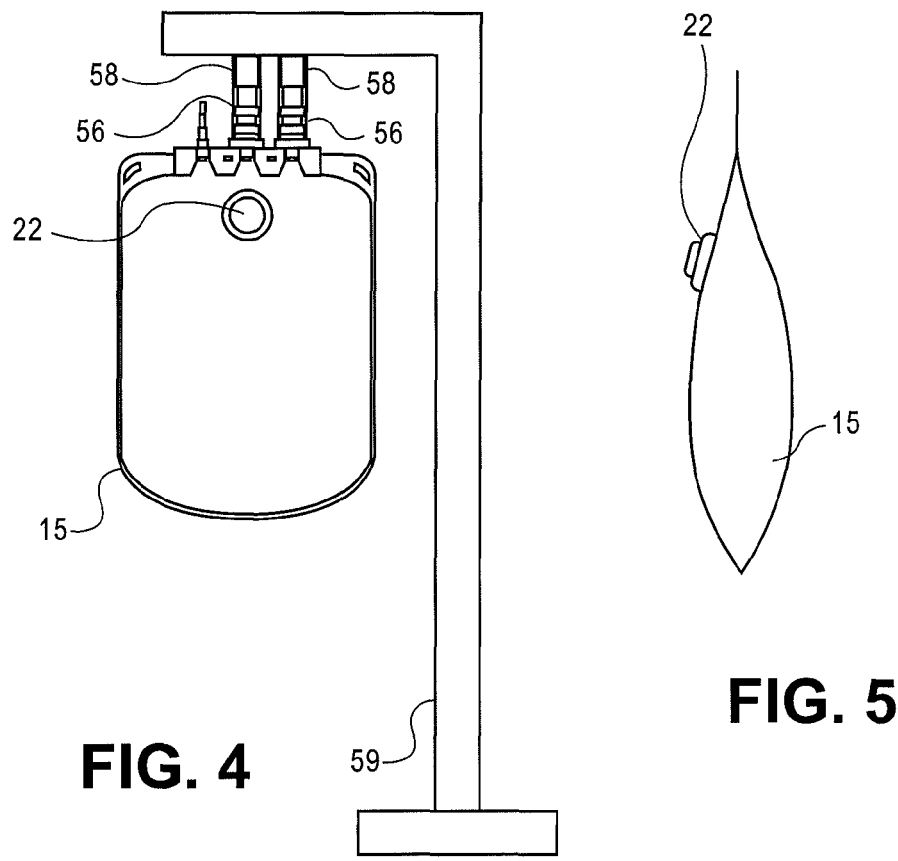
FIG. 4
FIG. 5
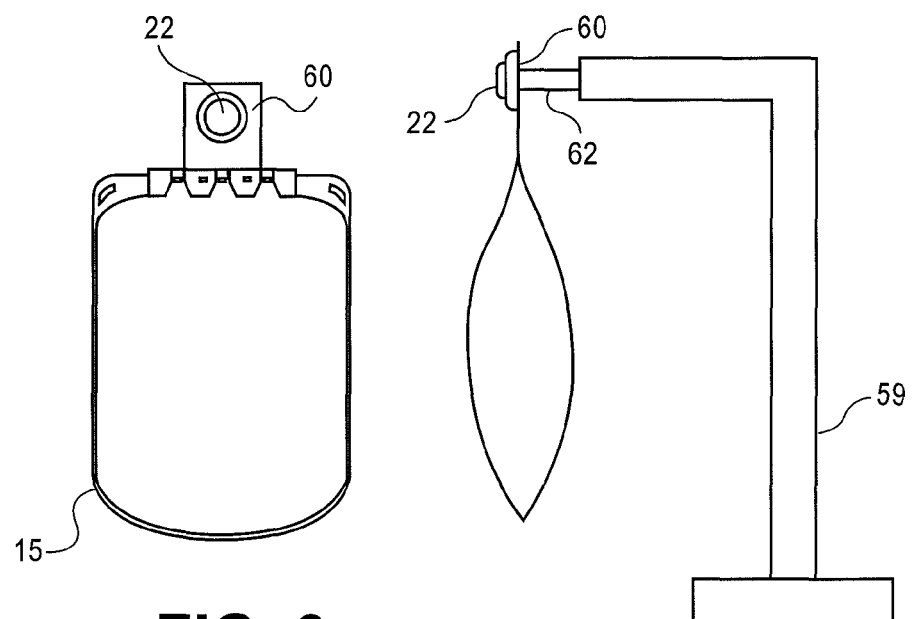
FIG. 6
FIG. 7

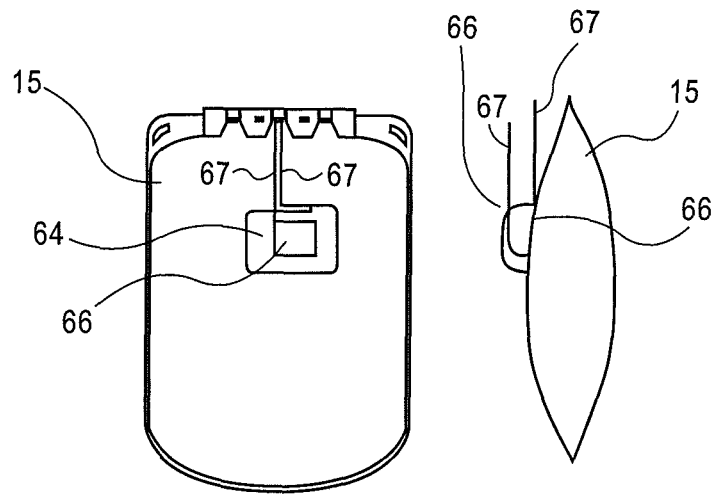
FIG. 8  FIG. 9
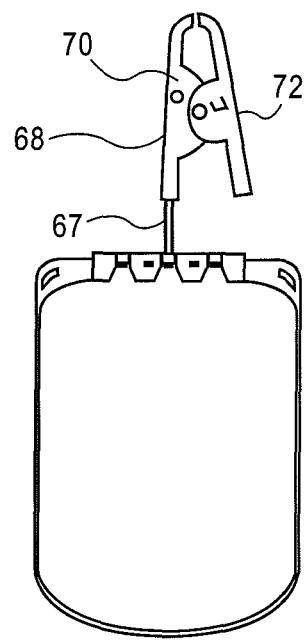
FIG. 10

SYSTEM AND METHOD FOR PRODUCT TRACKING AND PRODUCT TEMPERATURE PROFILING

This application claims priority to the provisional U.S. patent application entitled, SYSTEM AND METHOD FOR PRODUCT TRACKING AND PRODUCT TEMPERATURE PROFILING, filed Oct. 10, 2001, having a Ser. No. 60/327,769 the disclosure of which is hereby incorporated by reference.

FIELD OF THE INVENTION

The present invention relates generally to inventory tracking. More particularly, the present invention is directed to automated product tracking and product temperature profiling.

BACKGROUND OF THE INVENTION

In industries where there is a need to administer and maintain an inventory of goods, the goods are frequently stored in a storage unit and an individual is designated to monitor the goods. The monitoring of the goods often involves physically inspecting the location of the goods to perform an accounting. The accounting involves determining whether or not a particular item is present in the storage unit. It is not uncommon, however, for the individual responsible for physically inspecting the goods to perform an inaccurate accounting of the goods.

In the medical field, the monitoring of goods could be useful. The integrity of the blood units and the sample specimens is important. Units of blood or sample specimens from research activities are stored in laboratory refrigerators or ultra low temperature (ULT) freezers (freezers operating at −40 degrees and below) and medical professionals seek to ensure that the blood units or the sample specimens are not subjected to tampering.

Often the storage units where the blood units and sample specimens are placed is accessible to many individuals. Under open access conditions, units of blood or sample specimens may be removed from storage units or placed in storage units without an accounting of the transaction. Further, if tampering activities are performed, there may not be a system or method for identifying the individuals who performed the tampering activities. Therefore, it is difficult for medical professionals to administer the storage units to prevent the tampering of the blood units or sample specimens and maintain an accounting of the blood units or sample specimens.

In many industries, such as the medical and food industries, it is also important to maintain items at certain temperatures and/or to monitor items to identify any temperature changes associated with the items. For example, in the medical field, blood should to be maintained within a certain temperature range. Accordingly, it is desirable to provide a system and/or method for tracking the temperature of products. It is also desirable to take the temperature of products at discrete times and maintain a record/log of these temperatures.

Accordingly, it is also desirable to provide a system for automatically tracking inventory to reduce errors that may occur when an individual has to physically inspect the goods to perform an accounting.

In addition, it is desirable to provide a system that tracks the date and/or time that an item is removed from the storage unit, placed in the storage unit, or even placed in a location designated for another item.

Further, it is desirable to provide a system and method for allowing only individuals who are authorized to access a storage unit access to that particular storage unit. It is also desirable to provide a system that tracks the date and/or time that an individual accesses a storage unit.

In addition, it is also desirable to maintain a log of individuals who have accessed a storage unit. It is also desirable to maintain a log of items that have been removed or placed in a storage unit.

Further, it is desirable to provide a system that is accessible to a user who seeks to administer, monitor, or retrieve information regarding the storage unit and the contents of the storage unit.

SUMMARY OF THE INVENTION

In one aspect of the present invention, a storage unit is provided that includes a tracking device, wherein the tracking device monitors the presence of an item associated with the storage unit and monitors the temperature of the item and a processing device electrically linked to the tracking device that communicates with the tracking device.

In another aspect of the present invention, a method for storing an item in a storage unit is provided that includes storing the item, tracking the presence of the item, taking the temperature of the item, and maintaining information generated from tracking the presence of the item and taking the temperature of the item.

In yet another aspect of the present invention, a storage unit is provided that includes a means for storing an item, a means for taking the temperature of the item, a means for tracking the presence of an item, and a means for maintaining information generated from tracking the presence of the item and taking the temperature of the item.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a front elevation view of a system for product tracking and product temperature profiling in accordance with the present invention.

FIG. 5 is a side elevation view of the storage bag of FIG. 4.

FIG. 6 is a front elevation view of a storage bag of a system for product tracking and product temperature profiling in accordance with the present invention.

FIG. 7 is a side elevation view of a system for product tracking and product temperature profiling in accordance with the present invention.

FIG. 8 is a front elevation view of a storage bag of a system for product tracking and product temperature profiling in accordance with the present invention.

FIG. 9 is a side elevation view of the storage bag of FIG. 8.

FIG. 10 is a front elevation view of a system for electrically connecting a storage bag within a system for product tracking and product temperature profiling in accordance with the present invention.

DETAILED DESCRIPTION OF PREFERRED EMBODIMENTS

Figure 1:
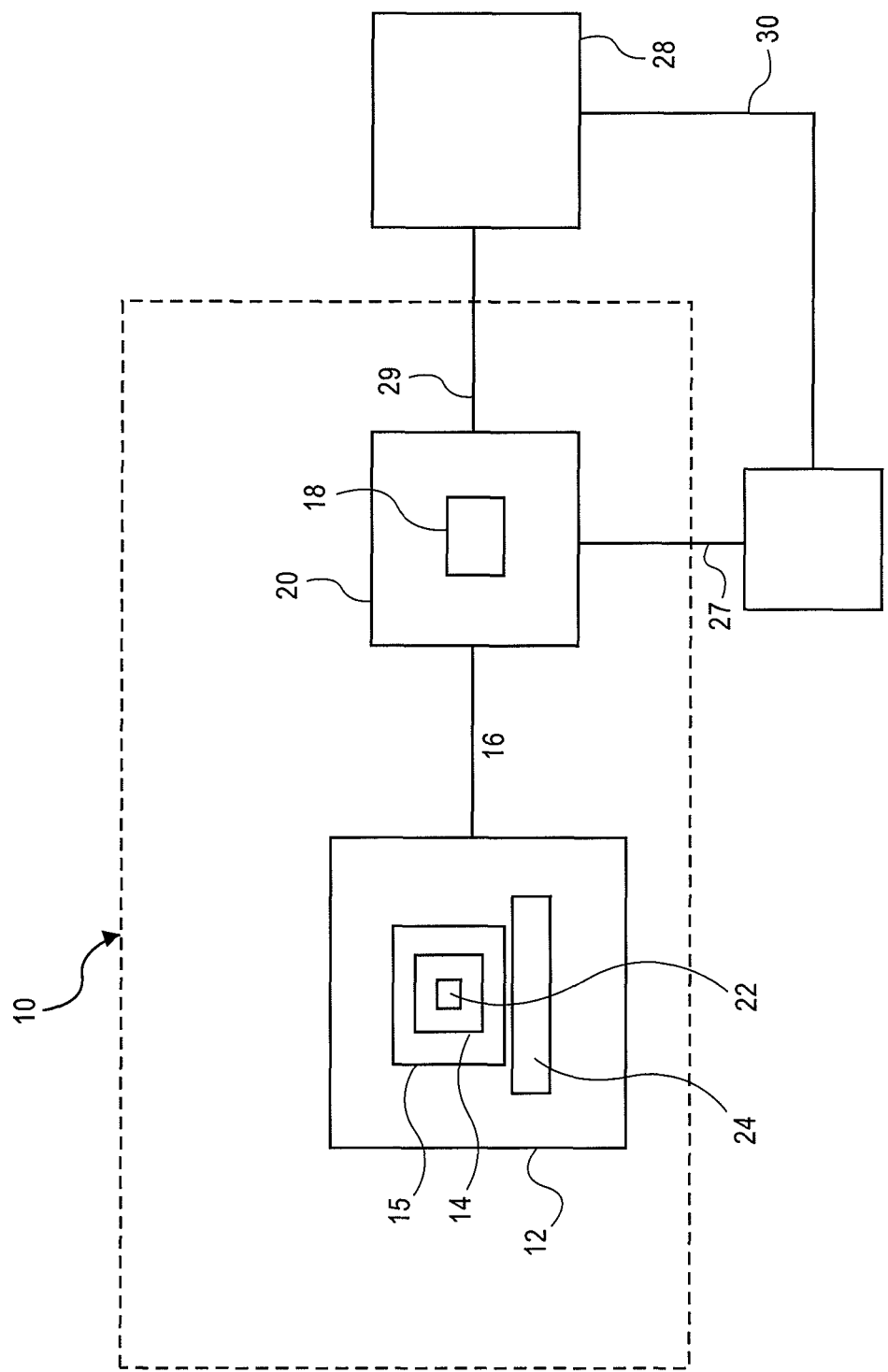
FIG. 1 is a block diagram of a system for product tracking and product temperature profiling in accordance with the present invention.

Referring now to the figures wherein like reference numerals indicate like elements, in FIG. 1 there is shown an exemplary embodiment of a system for product tracking and product temperature profiling in accordance with the present invention 10. As shown in FIG. 1, the system 10 includes one or more storage units 12, in which an item/goods 14 may be placed. The goods 14 may be accommodated within a container 15. The storage 12 unit is linked by a wireless, wireline or other conductor connection 16 to a processing and/or data storage device 18, for example a central processing unit (CPU), memory (data storage) and/or timing circuits, or a microcontroller 18. The CPU, a microcontroller, memory and/or timing circuits may be part of a network 20. The network 20 may, for example, be one or more computers or hand-held computing devices that contain CPU's, microcontrollers, memory and/or timing circuits.

The storage unit 12 may be any item capable of accommodating goods 14. For example, the storage unit may be a medical related storage unit, such as a plasma freezer, an enzyme freezer, a blood bank, a general laboratory refrigerator, a laboratory incubator, a refrigerated incubator, a plant growth chamber, a photostability chambers, and a ULT freezer. The storage unit may also be a food storage unit, such as a refrigerator, a freezer, or a warehouse room for dry goods.

In general, the goods 14 may be any product or products placed in a storage unit 12, including those for which security, accountability, inventory control and/or temperature tracking may be of concern.

The goods 14 may be associated with a processing and/or data storage device 18 or network 20 in a number of ways. In an exemplary embodiment of the present invention, the goods 14, when placed in the storage unit 12, are automatically linked to the processing and/or data storage device 18 or network 20. In another exemplary embodiment, the goods 14 are linked to the electronics of the storage unit 12 that is electronically linked to the processing and/or data storage device 18. In yet another exemplary embodiment of the present invention, a container 15 in which the goods 14 are placed is linked to the storage unit 12 that is linked to the processing and/or data storage device 18 or network 20. In another exemplary embodiment of the present invention, the goods 14 are electrically linked to a tray/shelf 24 that is linked to the processing and/or data storage device 18 or network 20, or to a storage unit 12 that is linked to the processing and/or data storage device 18 or network 20.

The electrical connection of the goods to the processing and/or data storage device 18 or network 20 is automatic, for example, by associating a tracking device 22, such as an iButton® available from Dallas Semiconductor, with the goods 14. The tracking device 22 associates the goods 14 with the processing and/or data storage device 18 or network 20 via a wireless, wireline, or other conductor link 16 from one or more conductive surfaces or portions of the tracking device 22 to one or more conductive surfaces or portions of the processing and/or data storage device 18 or network 20. By associating the tracking device 22 with the goods 14, the tracking device 22 serves as a means for identifying, monitoring and tracking the status and location of the goods 14.

The iButton is an example of a tracking device 22. The iButton is a 16 mm computer chip that can withstand extreme temperature conditions, and is designed to be durable, such that it lasts for years. Each has a unique registration number associated with it. A memory iButton can store the information, such as typed text and can also update the memory upon a simple contact to indicate that a contact has been made. An iButton may also contain a real-time clock to track the timing of the events associated with the iButton. The iButton may also have a conductive surface that may be utilized to link the iButton to other devices, for example, the processing and/or data storage device 18 or network 20.

In an exemplary embodiment of a system 10, in accordance with the present invention, the temperature of the goods 14 is taken and recorded at one or more predetermined and/or discrete time intervals. The tracking device 22 may perform the temperature tracking or a separate temperature profiling device may be provided to perform the temperature profiling. Whether the temperature is taken by the tracking device 22 or a separate temperature profiling device, the temperature information obtained will be communicated to a data storage device, such as a memory of or a memory associated with the processing and/or data storage device 18 or network 20. The data may be stored as instructed by the processing and/or data storage device 18, network 20 and/or as outputted by the tracking device 22 at predetermined intervals. In an exemplary embodiment of the present invention, the tracking device 22 or the separate temperature-tracking device separately stores the temperature tracking information when the goods 14 are not linked to the processing and/or data storage device 18 or network 20.

An iButton, such as the Thermocron iButton, is useable to track time and temperature. The Thermocron iButton integrates a thermometer, a clock/calendar, a thermal history log and memory to store information about the item or goods 14 associated with the Thermochron iButton. The Thermochron iButton is able to store the information corresponding to the taking of the temperature of the item or goods 14 at particular instances in time. The stored information may be accessed from the iButton, the processing and/or data storage device 18 and/or network 20.

The tracking device 22 communicates information about the status of the goods 14 to the processing and/or data storage device 18 or network 20. The information is then logged onto the respective device. The information about the status of the goods may be stored within the tracking device and/or in a data storage area, e.g., memory of the network 18. The stored information may be accessed directly via the tracking device 22 and/or the processing and/or data storage device 18 or network 20.

The association of the tracking device 22 with the goods 14 may be accomplished in a number of ways. For example, the tracking device 22 may be integrated into the construction of the container 15 in which the goods 14 may be placed, integrated with the contents of the goods 14, or associated with an inner storage unit 24, such as a tray that is associated with the goods 14. The present invention contemplates that more than one item may be associated with an inner storage unit 24, such as a tray, and that the items of the inner storage unit 24 may be monitored individually or collectively.

The tracking device 22 may be one of a plurality of tracking devices and each tracking device may be a serialized tracking device, wherein each tracking device that is electrically connected to the processing and/or data storage device 18 or network 20 has a unique identification associated with it, for example a serial number. In an exemplary embodiment, the tracking device 22 is assigned a unique serial number and is usable to log the temperature of an item or goods 14 at predetermined and/or discrete time intervals.

The tracking device 22 will be electrically connected to the processing and/or data storage device 18 or network 20 when it is electrically coupled to the respective device.

It will be readily understood, as described in exemplary embodiments of the invention herein, that a tracking device 22 may have one or more conductive portions, such that when the one or more conductive portions of the tracking device 22 mate or couple with conductive portions of a device that is electrically linked to the network 20, the access control system 26 and/or the external network 28, for example, the storage unit 12, the inner storage unit 24, or the container 15, the goods 14 associated with the tracking device 22 will be linked to the processing and/or data storage device 18, network 20, access control system 26 and/or external network 28.

In exemplary embodiments of the present invention, by linking the goods 14 to the processing and/or data storage device 18 or network 20 via the tracking device 22, any identifying, historical and/or current information related to the goods 14, e.g., the serial number, the time associated with any event related to the goods 14, and the temperature of the goods 14 at discrete times can be logged on to the processing and/or data storage device 18 or network 20.

For example, the processing and/or data storage device 18 or network 20 can then be utilized to recognize that an item has been placed in the storage unit 12, the date and time that the item 14 was placed in the storage unit, whether an item 14 has been removed from the storage unit, and/or the date and time that the item 14 was removed from the storage unit, whether an item 14 that was removed from the storage unit was replaced in the storage unit, the date and time the removed item was replaced in the storage unit, whether the temperature of the item 14 changed, and when the temperature of the item 14 changed.

In an exemplary embodiment of the present invention, the tracking device 22 is utilized to perform temperature profiling of the goods 14 when the goods 14 are outside of the storage unit 12. The information will be stored in the tracking device 22 and communicated to the processing and/or data storage device 18 or the network 20 when the goods 14 and/or the inner storage unit 24 is placed back into the storage unit 12.

The monitoring of access to the goods 14 may be accomplished by utilizing an access device or access control system 26 that serves as a means for granting access and/or a means for identifying that access has been made to the storage unit 12 and/or an inner storage unit 24. The access control system 26 may also serve as a means for identifying an individual that accesses a storage unit 12, an inner storage unit 24 associated with the goods 14, and/or the actual goods 14. The access control system 26 may be integrated with the storage unit 12.

The access system 26 may be a device such as a badge reader, a bioinformatics system, for example a retinal scanning system or a finger scanning system, a proximity switch, or an iButton that grants access to the goods 14 of the storage unit 12 and/or identifies the individual who seeks access to the goods 14. A badge reading system will be able to determine if the badge corresponds to a person authorized to access the storage unit 12 and will be able to log an individual's identification, the time, and/or date of access onto the processing and/or data storage device 18, network 20 and/or a storage unit 12, 24, 15 that is electrically coupled to the access control system 26. A bioinformatics system, such as a finger scanning system, will be able to determine whether an individual's fingerprint or fingerprints correspond to a person authorized to access the storage unit 12 and will also be able to log the individual's identification and/or the time and date of the individual's access.

Information regarding the events associated with, for example, the goods 14, the container 15, or the storage unit 12, such as whether one of the goods 14 has been removed from the storage unit 12, the identity of individuals who accessed the storage unit 12 during a certain time period, or the time the temperature of the goods 14 changed, can be provided to a user by utilizing an external network 28 that is electrically connected, for example, by a wireless, wireline or other conductor connection 29 to the automated access and inventory tracking system 10 in accordance with the present invention. The external network 28 is linked to the electronics embedded within the automated access and inventory tracking system 10 via one or more wireline, wireless or other conductor connections 30.

The external network 28 will serve as a means of providing the information logged by devices of the system 10, such as a tracking device 22 and access device 26, to someone interested in monitoring the events associated with the inner storage unit 24 or obtaining information on events associated with the storage unit 12. An external network may be, for example, an RS485, the Internet, an Intranet, a local area network (LAN) and/or a wide area network (WAN), or simply a CPU. In an exemplary embodiment, the external network 28 is integrated with the storage unit 20.

Figure 2:
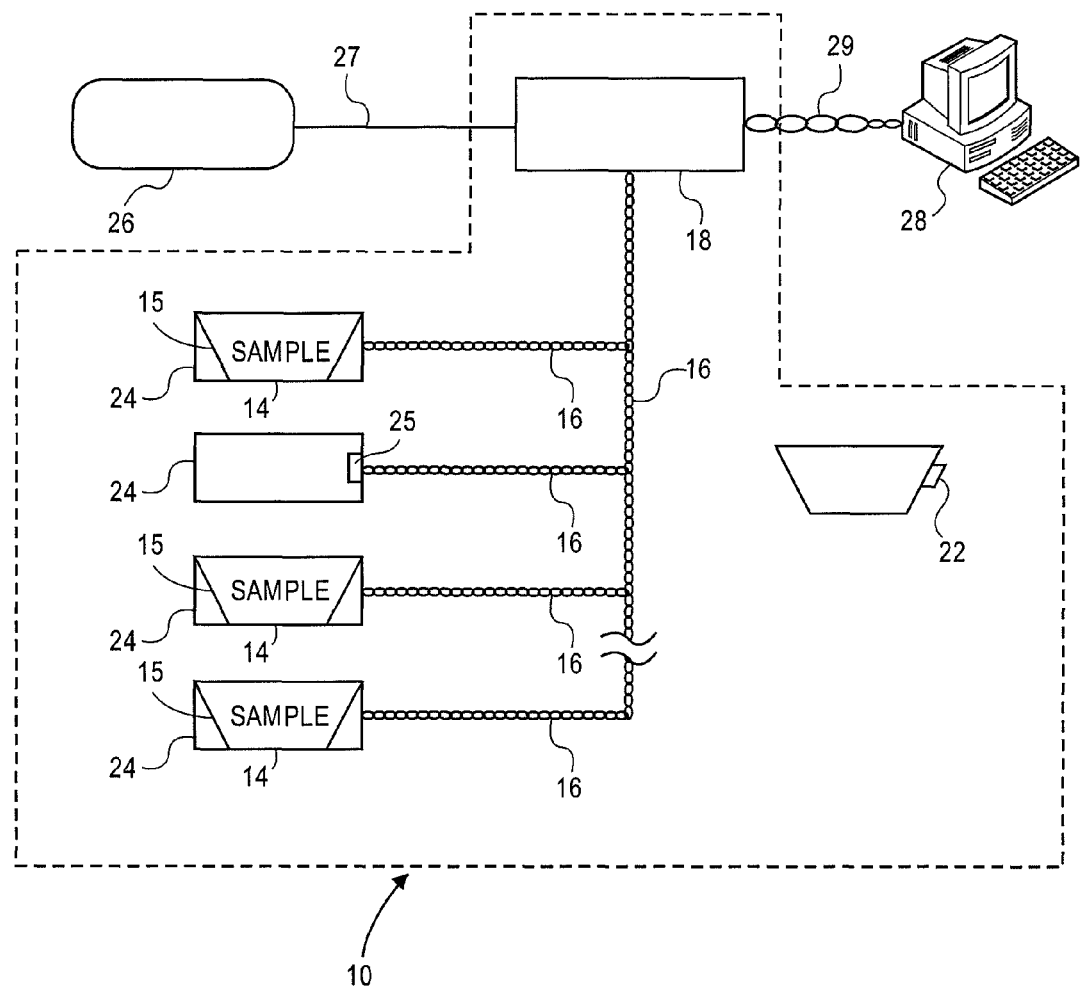
FIG. 2 is a diagram of a system for product tracking and product temperature profiling in accordance with the present invention.

As shown in FIG. 2, in an exemplary embodiment of the present invention, each sample of goods 14 is electrically connected to a microcontroller 18 via a tracking device 22 placed on a surface of the container 15 in which the sample 14 is placed. The container 15 may be located within a storage unit 12. The tracking device 22 mates or couples with a conductive portion 25, for example, a tracking device socket that is linked to the processing and/or storage device 18 via an electrical connection 16. In addition, an access control system 26 and an external network 28 are electrically connected to the processing and/or storage device 18 via electrical connections 27 and 29, respectively. The external network 28 allows a user and/or an administrator of the system 10 to access any information communicated to the processing and/or storage device 18.

Thus, according to an exemplary embodiment of a system 10 of the present invention, a user and/or an administrator of the system is able to know e.g., what goods 14 are in the storage unit 12, who has been in the storage unit 12, when goods 14 have been added or removed from the storage unit 12, and what goods have been added or removed from the storage unit 12, by accessing the external network 28 that is accessible to the user and that is electrically connected to the tracking system 10.

Figure 3:
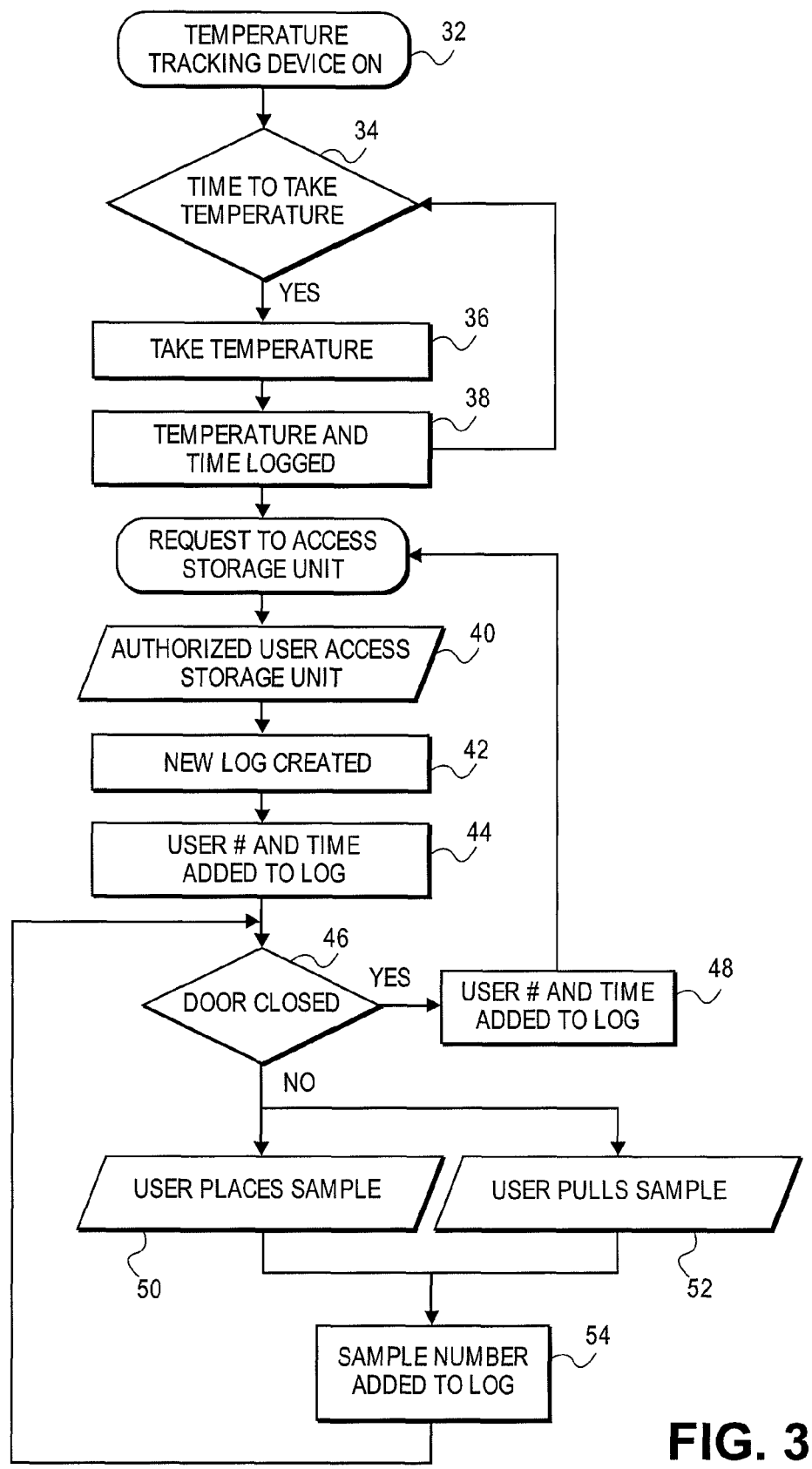
FIG. 3 is a flow chart of a system for product tracking and product temperature profiling in accordance with the present invention.

As shown in FIG. 3, after activation and any initialization of the tracking device 32, in one exemplary embodiment of the present invention, the system 10 determines if it is an appropriate time to record the temperature of the sample 14 at step 34, takes the temperature of the sample 14 at step 36, and adds the time and temperature to a log of the system 10 at step 38. The tracking of the temperature takes place whether or not a user has obtained access to the storage unit 12 and may take place even when the sample 14 is out of the storage unit 12.

When an authorized user accesses the storage unit 12 at step 40, a new log is created at step 42 by the access device 26 that identifies the user according to, for example, a number associated with the user and/or the time associated with the user's access to the storage unit 12 at step 44. The system 10 checks to determine whether the door of the storage unit 12 is closed at step 46. If the door is closed, the user's identification number and the time associated with the closing of the storage door are recorded in the log at step 48. If the system 10 determines that the door to the storage unit 12 is not closed and the user places the sample 14 in the storage unit 12 at step 50 and/or pulls a sample 14 from the storage unit 12 at step 52, the corresponding sample identification, such as an identification number associated with the sample 14, is added to the log at step 54. The system 10 continues to monitor events associated with the storage unit 12, until the door of the storage unit 12 is closed at step 46. When the door is closed, the user's identification number and/or the current time are added to the log at step 48.

FIGS. 4-22 illustrate exemplary embodiments of methods and devices for electrically linking a tracking device 22 of the goods 14 to one or more conductive portions that may be utilized to link the goods 14 directly and/or indirectly to the processing and/or data storage device 18 or network 20. It should be understood that the conductive portions described with reference to FIGS. 4-22 may also be utilized to directly and/or indirectly link the goods 14 to an access control system 26 and/or an external network 28. It should further be understood that for the purposes of describing exemplary embodiments of the present invention with reference to FIGS. 4-22, the goods 14 are described as linked to the network 20. However, the goods 14, in any exemplary embodiment of the present invention, may be electrically linked to any processing and/or storage device 18.

In an exemplary embodiment of the present invention, a storage bag is utilized as a container 15. The storage bag 15 is accommodated with one or more conductors 56. The conductors 56 are designed to mate/couple with connectors 58 that are coupled to a hanging apparatus 59 that is linked to a the network 20 via a wireless, wireline, or other conductor connection between the hanging apparatus 59 and the processing and/or storage device 18 or network 20.

FIG. 5 is a side elevation view of the storage bag of FIG. 4. As shown in FIG. 5, the tracking device 22 may protrude from a surface of the bag 15.

Alternatively, as shown in FIG. 6, the tracking device 22 is a part of a tracking device socket 60. As shown in FIG. 7, one or more conductor portions or mating socket 62 is provided on the hanging apparatus 59 that is electrically connected to the network 20. The tracking device socket 60 and the one or more conductor portions/mating socket 62 are designed such that when the tracking device socket 60 is coupled to the conductor/mating socket 62, the storage bag 15 will be electrically connected to the network 20 via the hanging apparatus 59.

In another exemplary embodiment of the present invention, a pouch 64 is integrated with the storage bag 15 or coupled to the storage bag 15. The pouch 64 is accommodated with one or more conductive portions 66 to establish an electrical connection with the tracking device 22. The conductive portions 66 may be electrically connected to or formed continuously with conductor portions 67, which are, for example, wires that are electrically connected to the network 20. As shown in FIG. 9, in an exemplary embodiment of the present invention, a conductive portion 66 is placed on a top and a bottom surface of pouch 64, such that when the tracking device 22 is placed in the pouch 64, the storage bag 15 is electrically linked to the network 20, the access control system 26, and/or the external network 28 via conductors 66 and/or 67 that may be linked to any one or more of the aforementioned devices.

In an exemplary embodiment of the present invention, a spring loaded clasp 68, as shown in FIG. 10, may be utilized to electrically connect one or more conductors 66, 67 from the bag 15 to the clasp 68 that is utilized to connect the bag 15 to the network 20. The clasp 68 may have clasp conductive portions 70, 72, which may be at or near the tip of the clasp 68, that are linked to the conductors 66 and/or conductors 67 of the bag.

It should be understood that the clasp configuration shown in FIG. 10, in another exemplary embodiment of the present invention, is reversed such that the clasp 68 extends from the hanging apparatus 59 and is utilized to clamp onto the conductive portions 66 or conductive portions 67 of the storage bag 15.

Figure 11:
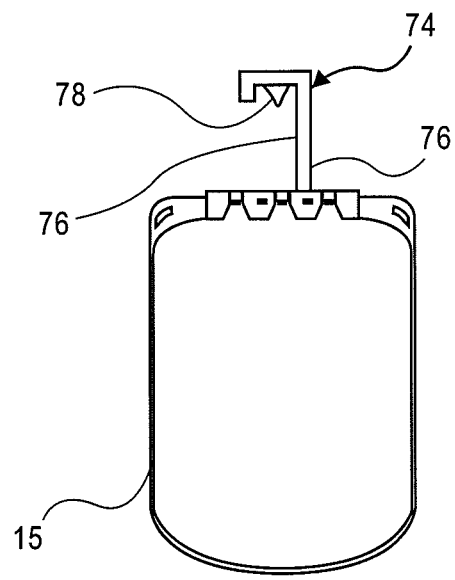
FIG. 11 is a front elevation view of system for electrically connecting a storage bag within a system for product tracking and product temperature profiling in accordance with the present invention.

In another exemplary embodiment of a system 10 in accordance with the present invention, as shown in FIG. 11, a hook 74 is utilized to electrically connect the bag 15 to the network 20. The hook 74 may be formed from one or more conductive portions 76 or have one or more conductor portions 76 coupled to the conductors 66 or 67 of the pouch 64 and/or the bag 15. The hook 74 is designed to link the bag 15 to the network 20, access control system 26 or external network 28 when the one or more conductive portions 76 of the hook 74 electrically couple with the hanging apparatus 59 that is electrically connected to the network 20.

Alternatively or in addition to the one or more conductive portions 76, the hook 74 may have a tip portion 78, which separately or in conjunction with the one or more conductive portions 76, electrically connects the storage bag 15 to the network 20, access control system 26 or external network 28 when gravity brings the hook 74 into contact with the conductors or mating slot of the rack 59, and the tip portion 78 mates or couples with conductors or a mating slot of the hanging rack 59.

Figure 12:
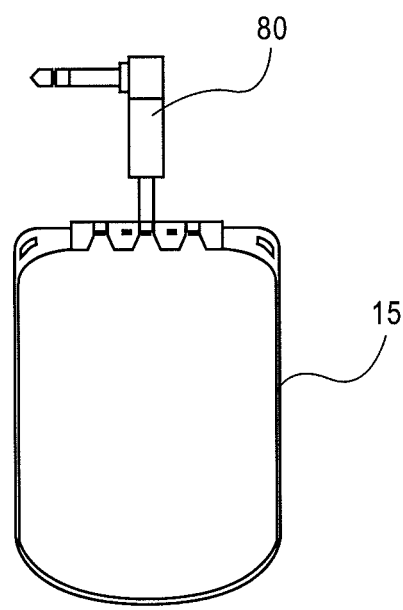
FIG. 12 is a front elevation view of a system for electrically connecting a storage bag within a system for product tracking and product temperature profiling in accordance with the present invention.

As shown in FIG. 12, in yet another exemplary embodiment of a system 10 in accordance with the present invention, a plug, for example, a right angle phono jack 80 is utilized to link the bag 15 to the network 20. The phono jack 80 is able to link the bag 15 to the network 20 when the conductors 66 and/or 67 of the bag 15 are electrically connected to the phono jack 80. The phono jack 80 is designed to mate with a phono jack socket of, for example, the hanging rack 59 that is electrically connected to the network 20, access control system 26 and/or external network 28.

Figure 13:
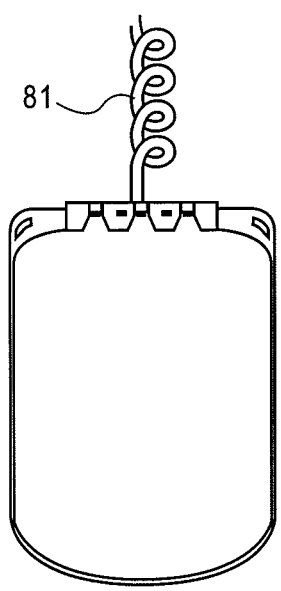
FIG. 13 is a front elevation view of a system for electrically connecting a storage bag within a system for product tracking and product temperature profiling in accordance with the present invention.

In another exemplary embodiment, as shown in FIG. 13, an umbilical cord, accordion style cable or other similar conductor or conductor assembly 81 is utilized to electrically connect the bag 15 to the network 20, access control system 26 and/or external network 28 when the one or more conductors 66 and/or 67 of the bag 15 are electrically coupled to the cable 81.

Figure 14:
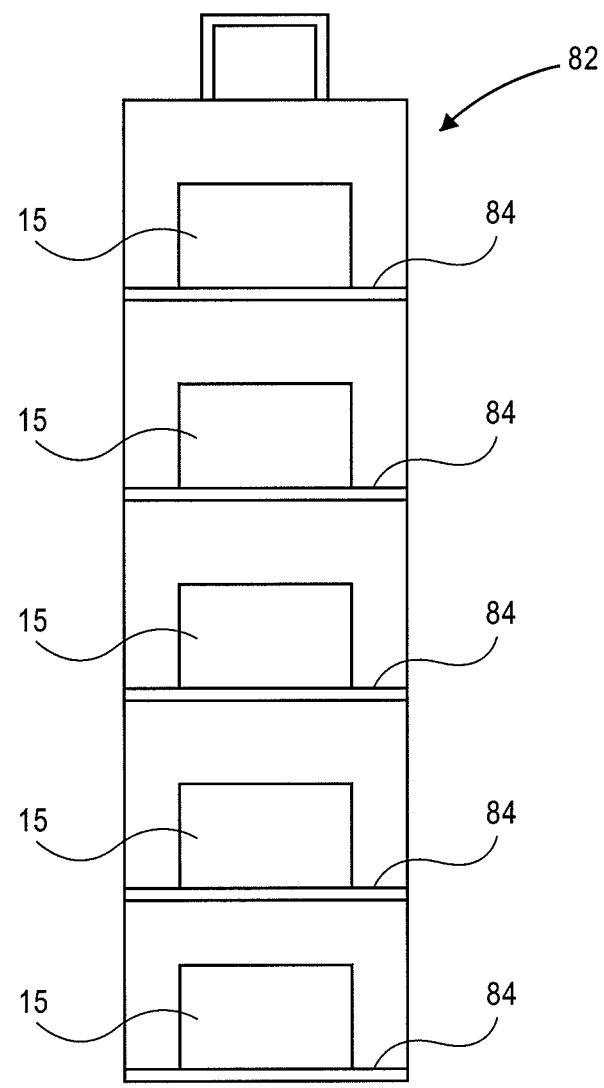
FIG. 14 is a front plan view of a system for product tracking and product temperature profiling in accordance with the present invention.

FIG. 14 illustrates another exemplary embodiment of a tracking system 10 in accordance with the present invention. Shown in FIG. 14 is a rack 82 having one more shelves 84. The goods 14 may be placed directly on the shelf 84 or placed in the container 15 that is placed on the shelf 84. The container 15 may be permanently affixed to the shelf 84 or removable from the shelf 84.

To link the goods 14 with the network 20, a tracking device 22 is, for example, placed with the goods 14, coupled to the container 15 in which the goods 14 are placed, or coupled to a shelf 84 on which the goods are stored. A wireless, wireline, or other electrical conductor connection is established between the tracking device 22 and the network 20, the access control system 26 and/or external network via exemplary embodiments of methods and devices described herein.

Figure 15:
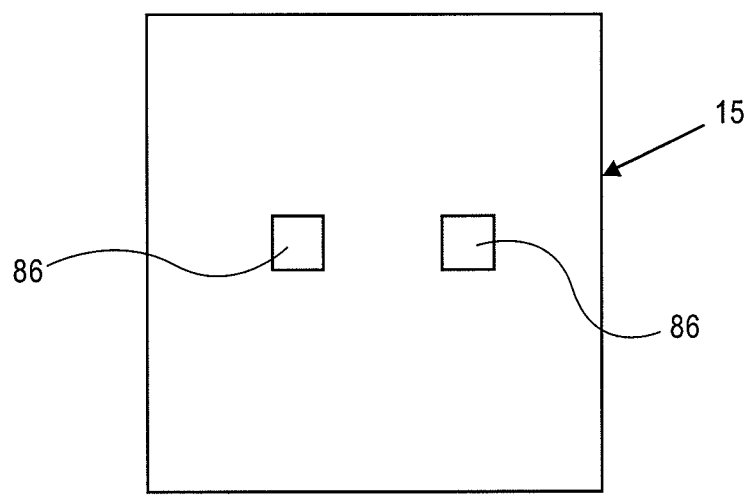
FIG. 15 is a bottom elevation view of a container 15 of a system for product tracking and product temperature profiling in accordance with the present invention.

In an exemplary embodiment of the present invention, as shown in FIG. 15, the container 15 has one or more electrodes 86 that are designed to couple the container 15 to corresponding electrodes on a surface of the shelf 84 or a surface of the rack 82. The container 15 is linked to the network 20, access control device 26 and/or external network 28 when the electrodes of the shelf 84 or the surface of the shelf 84 are electrically connected to the network 20, access control system 26 or external network 28.

Figure 16:
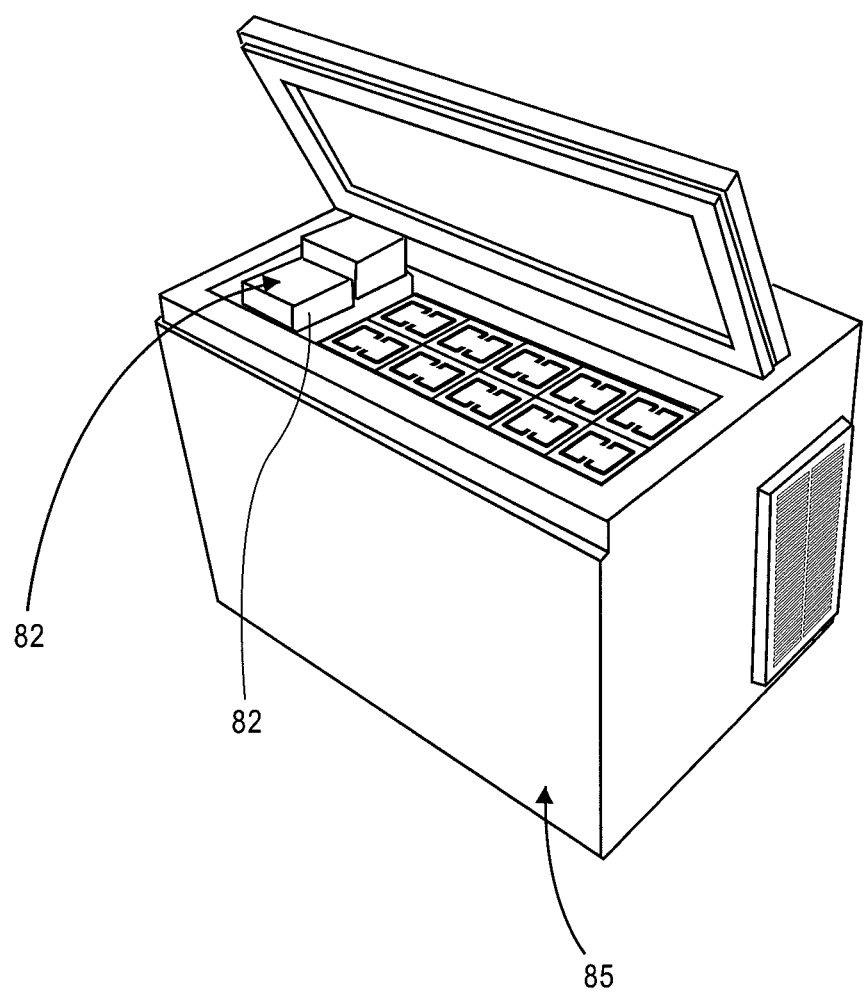
FIG. 16 is a perspective view of a system for product tracking and product temperature profiling in accordance with the present invention.

In another exemplary embodiment of the present invention, one or more electrodes are placed on a surface of the rack 82, for example the bottom surface of the rack 82 and are designed to couple to one or more electrodes of a corresponding surface of a storage unit 85 that is shown in FIG. 16. The one or more electrodes on the bottom surface of the storage unit 85 may be utilized to link the rack 82 as a whole unit to the network 20, access control system 26 or external network 28. When the electrodes 86 on the bottom surface of the rack 82 mate or couple with one or more electrodes of the bottom surface of the storage unit 85, the status of the rack 82 as a whole unit can be monitored.

In an exemplary embodiment of the present invention, each of the tracking devices 22 associated with the goods 14, container 15, and/or shelf 84 is electrically connected to one or more electrodes on the bottom surface of the rack 82, such that the goods 14 are individually linked to the network 20, access control system 26 or external network 28 when the one or more electrodes on the bottom surface of the rack 82 mate or couple with corresponding electrodes on the bottom surface of the storage unit 85 that are electrically connected to the network 20, access control device 26 and/or external network 28.

Figure 17:
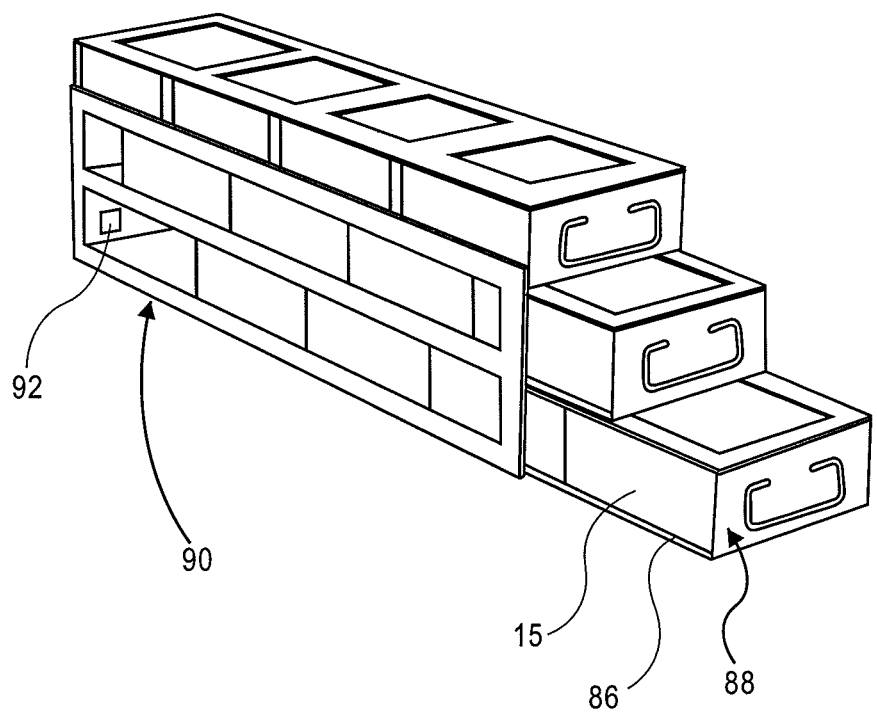
FIG. 17 is a perspective view of a system for product tracking and product temperature profiling in accordance with the present invention.
Figure 18:
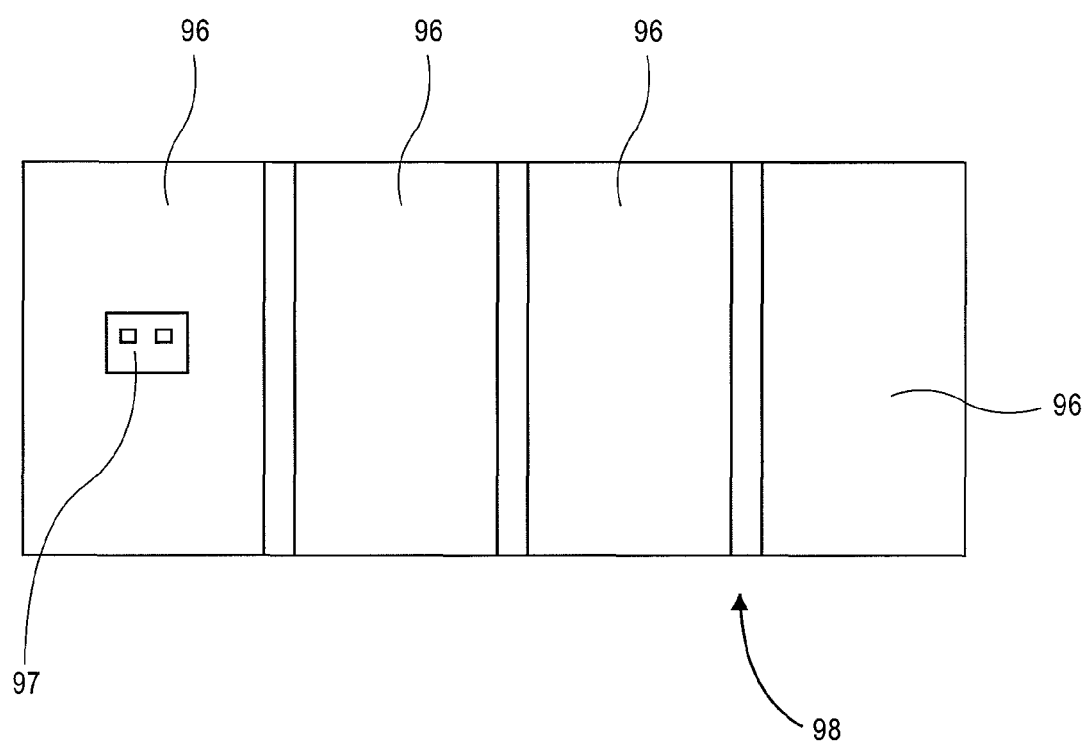
FIG. 18 front elevation view of a system for product tracking and product temperature profiling in accordance with the present invention.

FIGS. 17-18 illustrate another exemplary embodiment of a tracking system 10 in accordance with the present invention. As shown in FIG. 17, the goods 14 may be placed in a container 15 that is placed on a shelf 86 of a drawer 88. It should be understood that the drawer 88 may be designed with or without an individual compartment for the container 15. Similar to the tracking system of FIGS. 14-16, the goods 14 or container 15 may be individually linked to the network 20 or linked to the network 20 when the a conductive surface of the tracking device 22 associated with the goods 14 is electrically linked to one or more conductive portions 92 on a surface of the drawer storage rack 90, for example, a back surface, that is linked to the network 20, access control system 26, and/or external network 28. For example, the status and/or identifying information of the goods, 14, the container 15, and/or the drawer 88 are logged onto the network 20 when the drawer 88, for example, is rolled or slid back into the drawer storage rack 90 and a conductor on the back of the drawer mates or couples with a compatible conductor on the back of the drawer storage rack 90 that is linked to the network 20, access control system 26 or external network 28.

In another exemplary embodiment of the present invention, the drawer storage rack 90 can be monitored as a whole unit when one or more conductors placed on a surface of the drawer storage rack 90, for example, a back surface, mates or couples with the one or more corresponding conductors 97 on a back surface of the storage unit 98 shown in FIG. 18 that is electrically linked to the network 20, the access control system 26 and/or the external network 28.

Figure 19:
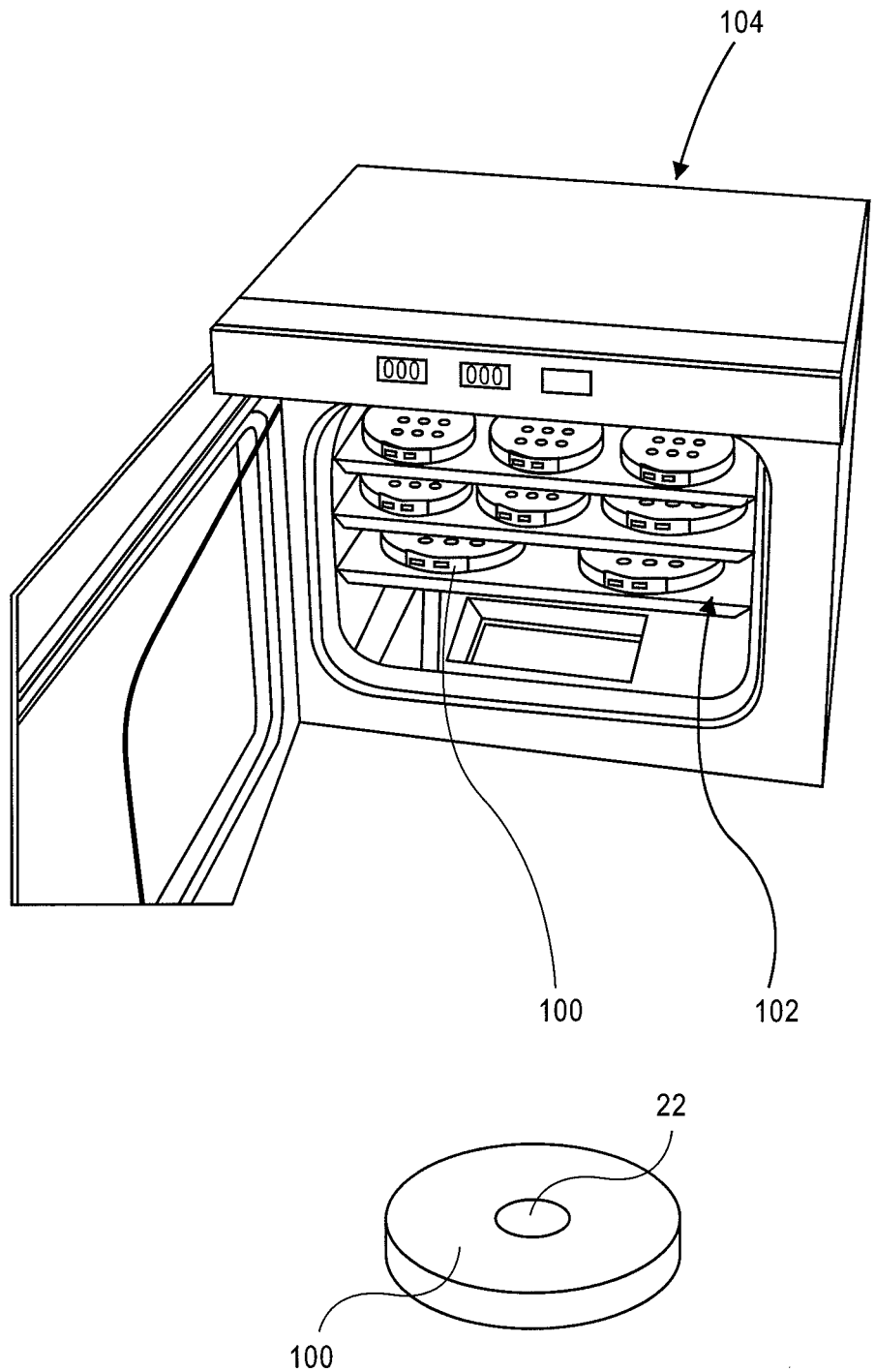
FIG. 19 is a perspective view of a system for product tracking and product temperature profiling in accordance with the present invention.
Figure 20:
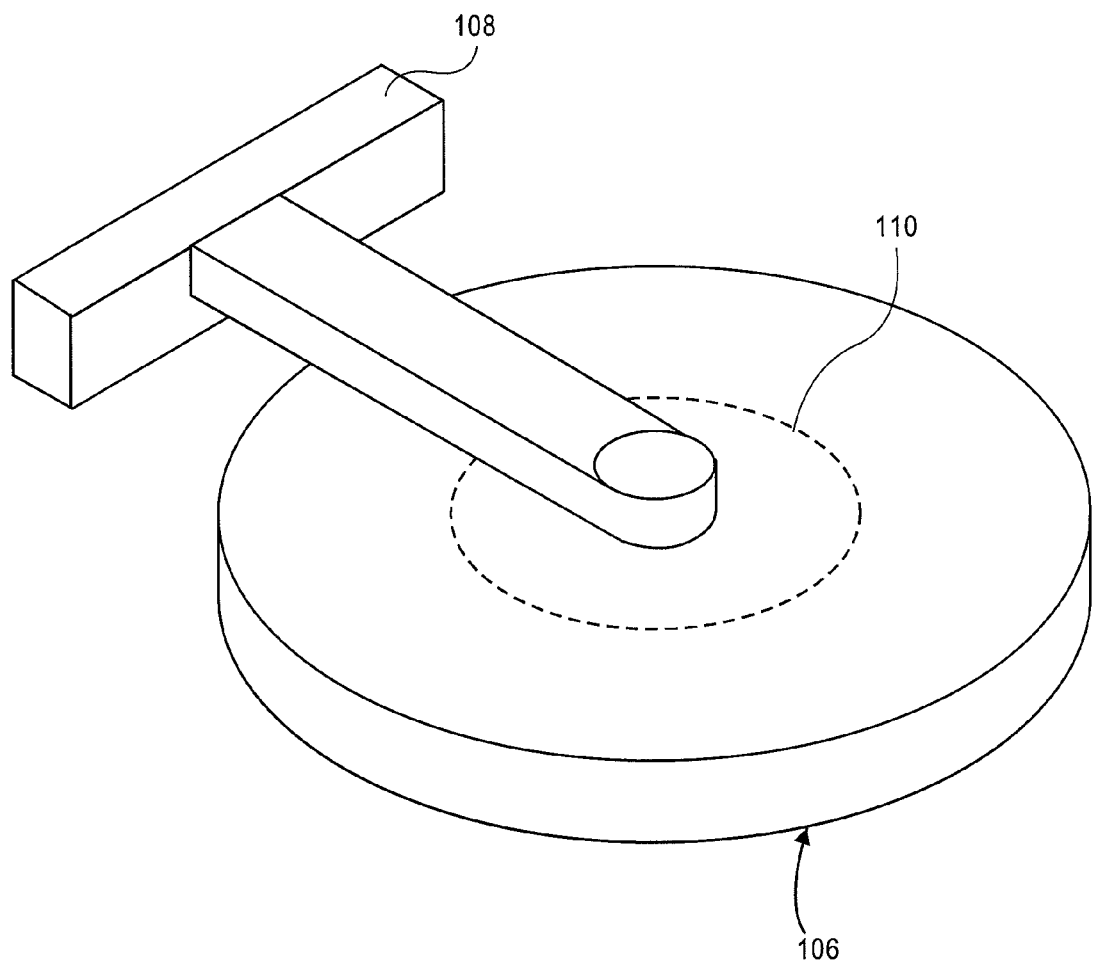
FIG. 20 is a perspective view of a system for product tracking and product temperature profiling in accordance with the present invention.

FIG. 19 illustrates another exemplary embodiment of a tracking system 10 in accordance with the present invention. Shown in FIG. 19 are petri dishes 100 that can be utilized to store goods 14, such as sample specimens. Each petri dish 100 is accommodated with a tracking device 22 and may be placed on a sliding tray/drawer 102 within a storage unit 104. A device, such as a mechanical arm 106, as shown in FIG. 20, is coupled to a surface of the storage unit 104. In an exemplary embodiment of the present invention, the mechanical arm 106 is coupled to the storage unit 104 via a hinge 108.

In an exemplary embodiment of the present invention, the mechanical arm 106 has a tracking device reader and/or writer 110, for example, an iButton socket, positioned on one of its surfaces, for example, a bottom surface, or integrated with the design of the mechanical arm 106. The tracking device reader and/or writer 110 is linked to the network 20, access control device 26 and/or external network 28 and links the petri dish 100 to the network 20, access control system 26, and/or external network 28 when the mechanical arm 106 is moved, for example, downward from a side of the storage unit 104 and the tracking device reader and/or writer 110 makes an electrical connection with the tracking device 22 of the petri dish 100.

Figure 21:
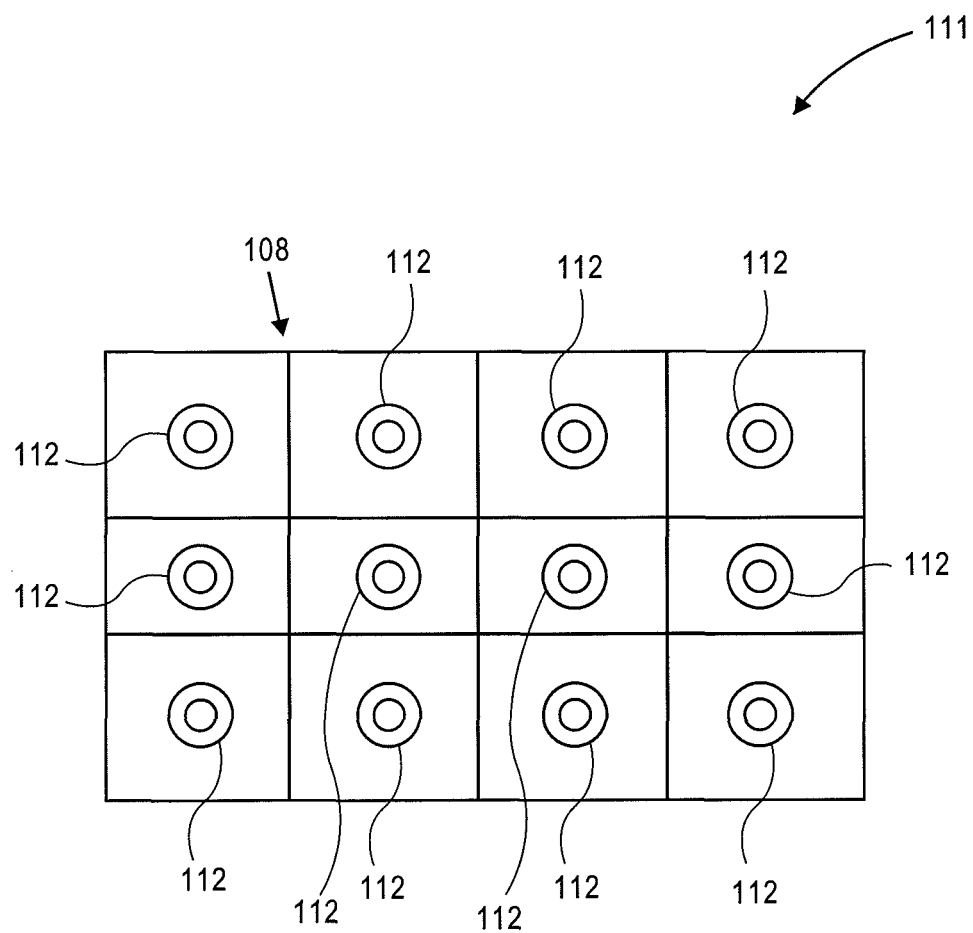
FIG. 21 is a top plan view of a shelf of a system for product tracking and product temperature profiling in accordance with the present invention.

In another exemplary embodiment of a system 10 in accordance with the present invention, a shelf 111, as shown in FIG. 21 may have tracking device readers and/or writers 112 formed in a matrix on the shelf 111. The tracking device readers and/or writers 112 are electrically linked to the network 20, access control system 26, and/or external network 28. As shown in FIG. 21, a matrix of tracking device readers and/or writers 112 are placed such that when the shelf 111 is placed, for example, on top of a petri dish 100 on tray 102 and contact is made between the tracking device reader and/or writer 112 and the tracking device 22 associated with the respective petri dish 100, the petri dish 100 is electrically connected to the network 20, access control device 26 and/or external network 28.

Figure 22:
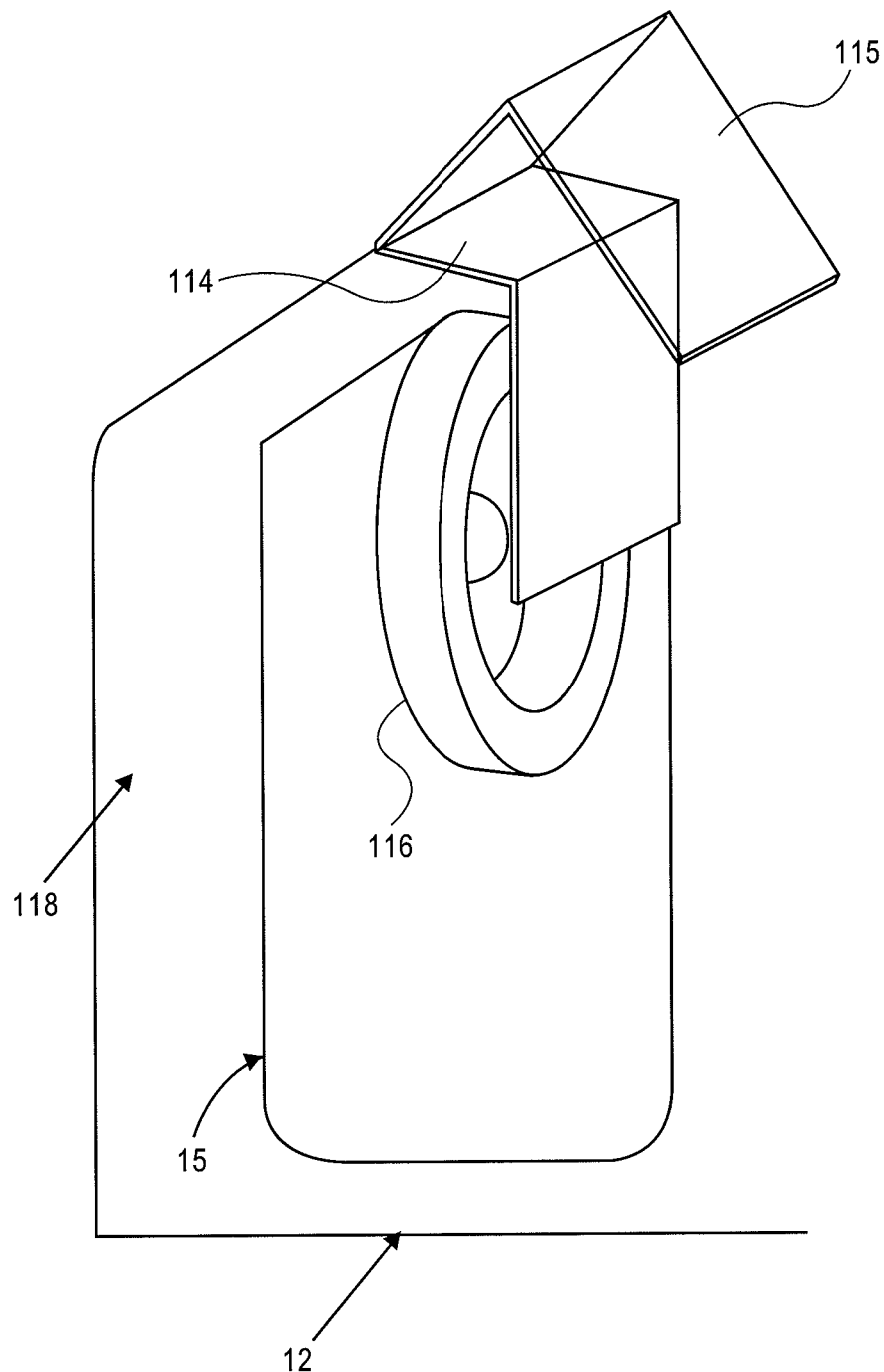
FIG. 22 is a perspective view of a system for product tracking and product temperature profiling in accordance with the present invention.

FIG. 22 illustrates another exemplary embodiment of a device for linking goods to a system 10 in accordance with the present invention. Shown in FIG. 22 is a restraint latch 114. The restraint latch may be coupled to the network 20, access control system 26, and/or external network 28. A tracking device reader and/or writer socket 116 is coupled to the restraint latch 114. When the tracking device reader and/or writer socket 116 is coupled to the tracking device 22 associated with the goods 14, the goods 14 will be coupled to the network 20, the access control system 26, and/or the external network 28. The restraint latch may also be utilized as a support mechanism for the goods 14. Support to the goods 14, for example the storage bag 15 can be withdrawn when the restraint latch 114 is moved to a second position 115 and the restraint latch is no longer in contact with the goods 14.

For example, in an exemplary embodiment of the present invention, when a tracking device 22 of a storage bag 15 is coupled to the tracking device reader/writer socket 116, the storage bag 15 can be fully supported by the restraint latch 114. In another exemplary embodiment of the present invention, as shown in FIG. 22, the tracking device reader/writer socket 116 of the restraint latch 114 is utilized to secure the storage bag 15 to a surface 118 of the storage unit 12.

It should be understood that similar approaches as described herein could be utilized with other storage/inventory type of accessories, such as trays, microplates/fibre boards, storage devices, etc. that are designed, as described herein, such that their placement into the interior of a storage unit 12 creates an electrical connection to the processing and/or data storage device 18, the network 20, the access control system 26 and/or external network 28. Accordingly, the addition, removal and/or temperature of any goods/inventory 14 from the respective storage unit could be tracked by the processing and/or data storage device 18, the network 20, the access control system 26 and/or the external network 28.

According to the system 10 of the present invention, a literally "hands-off" error-free approach to tracking crucial temperature information or temperature-sensitive products is provided. Further, the system 10 provides a high level of accountability and traceability.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A storage system, comprising:
   a storage unit;
   a plurality of tracking devices configured to permit (i) monitoring the presence of a plurality of items removably stored within the storage unit, (ii) monitoring the temperature of the plurality of items and (iii) generating tracking data;
   at least one real-time clock tracking the timing of events associated with the plurality of items, the events including temperature of the plurality of items, insertion or removal of the plurality of items into or from the storage unit, and access to the plurality of items by a user;
   an access control system configured to grant access and identify access to the plurality of items by the user through an identification of the user; and
   a processing device that reads and records the tracking data from the plurality of tracking devices, the timing of the events, and the identification of the user from the access control system.

2. The storage system of claim 1, further comprising a plurality of inner storage units positioned within the storage unit.

3. The storage system of claim 2, further comprising:
   a plurality of inner storage units configured to contain the plurality of items;
   a data storage device that is electrically linked to the processing device,
   wherein each of the plurality of tracking devices is associated with a respective one of the plurality of inner storage units to permit tracking of each of the plurality of items in each of the plurality of inner storage units, each of the tracking devices communicating with a network to store and receive information with regard to profiling the temperature, tracking the location of the items and access by users to the plurality of items, the identification of the user being made through an identification number associated with the user.

4. The storage system of claim 3, wherein the tracking data is stored in the data storage device including historical and current information related to the items, with the tracking device being integrated into the construction of each of the plurality of inner storage units and each tracking device having a unique identifier.

5. The storage system of claim 2, wherein at least of the plurality of inner storage units is a rack and the access device is integrated with the rack and grants access and identifies access to the rack.

6. The storage system of claim 2, wherein at least one of the plurality of inner storage units is a drawer storage rack.

7. The storage system of claim 2, wherein at least one of the plurality of inner storage units is a drawer.

8. The storage system of claim 2, wherein at least one of the plurality of inner storage units is a shelf having electrodes, and further wherein the electrodes of the shelf are electrically connected to a network with the processing device so that the status of the items is monitored.

9. The storage system of claim 2, wherein at least one of the plurality of inner storage units is a tray, with the items being electronically linked to the tray that is electronically linked to a data storage device storing the tracking data from the items with respect to the tray, the data storage device being controlled by the processing device.

10. The storage system of claim 2, wherein at least one of the plurality of inner storage units is a petri dish.

11. The storage system of claim 2, wherein at least one of the plurality of inner storage units is a blood bag.

12. The storage system of claim 2, wherein at least one of the plurality of inner storage units has a conductive portion that electrically links the tracking device to the processing device.

13. The storage system of claim 12, wherein the conductive portion is a hook, with the hook being placed on a top and a bottom surface of the inner storage container, the inner storage container being a pouch.

14. The storage system of claim 12, wherein the conductive portion is a phono jack.

15. The storage system of claim 12, wherein the conductive portion is an accordion cable.

16. The storage system of claim 12, wherein the conductive portion is connector.

17. A storage system, comprising:
a storage unit;
a plurality of tracking devices configured to permit (i) monitoring the presence of a plurality of items removably stored within the storage unit, (ii) monitoring the temperature of the plurality of items and (iii) generating tracking data;
at least one real-time clock tracking the timing of events associated with the plurality of items, the events including temperature of the plurality of items, insertion or removal of the plurality of items into or from the storage unit and access to the plurality of items by a user;
an access control system granting access to the plurality of items by the user; and
a processing device that reads and records the tracking data from the plurality of tracking devices and the timing of events.

* * * * *

UNITED STATES PATENT AND TRADEMARK OFFICE
CERTIFICATE OF CORRECTION

| | | |
|---|---|---|
| PATENT NO. | : 9,460,413 B2 | |
| APPLICATION NO. | : 10/026840 | |
| DATED | : October 4, 2016 | |
| INVENTOR(S) | : Bryan M. Elwood | |

It is certified that error appears in the above-identified patent and that said Letters Patent is hereby corrected as shown below:

Title Page, (57) Abstract, last sentence, change "An external network may also be provided which allows a user to monitor the storage unit including, access to the storage unit, and a temperature of the storage unit." to --An external network may also be provided which allows a user to monitor the storage unit including access to the storage unit, and a temperature of the storage unit.--.

In the Specification:

In column 3, line 28, change "FIG. 11 is a front elevation view of system for" to --FIG. 11 is a front elevation view of a system for--.

In column 3, line 53, change "FIG. 18 front elevation view of" to --FIG. 18 is a front elevation view of--.

In column 4, line 11, change "The storage 12 unit is" to --The storage unit 12 is--.

In column 4, line 26, change "a plant growth chamber, a photostability chambers, and a ULT freezer." to --a plant growth chamber, a photostability chamber, and a ULT freezer.--.

In column 8, line 33, change "to a the network 20" to --to the network 20--.

In column 10, line 39, change "when the a conductive surface" to --when a conductive surface--.

In the Claims:

In claim 5, column 12, line 64, change "wherein at least of the plurality of" to --wherein at least one of the plurality of--.

In claim 16, column 14, line 6, change "wherein the conductive portion is connector." to --wherein the conductive portion is a connector.--.

Signed and Sealed this
Twenty-ninth Day of November, 2016

Michelle K. Lee
*Director of the United States Patent and Trademark Office*